United States Patent
Jansma

(10) Patent No.: US 8,212,395 B2
(45) Date of Patent: Jul. 3, 2012

(54) SYSTEMS AND METHODS FOR OPTIMIZING POWER LOADS IN A POWER DISTRIBUTION UNIT

(75) Inventor: Michael Jansma, Eureka, MO (US)

(73) Assignee: American Power Conversion Corporation, West Kingston, RI (US)

( * ) Notice: Subject to any disclaimer, the term of this patent is extended or adjusted under 35 U.S.C. 154(b) by 334 days.

(21) Appl. No.: 12/608,134

(22) Filed: Oct. 29, 2009

(65) Prior Publication Data

US 2011/0101777 A1    May 5, 2011

(51) Int. Cl.
*H02J 3/14* (2006.01)
(52) U.S. Cl. .......................................... 307/38; 713/300
(58) Field of Classification Search ................ None
See application file for complete search history.

(56) References Cited

U.S. PATENT DOCUMENTS

| | | | | |
|---|---|---|---|---|
| 4,215,277 A | * | 7/1980 | Weiner et al. | 307/41 |
| 4,719,364 A | * | 1/1988 | Pequet et al. | 307/141 |
| 5,424,903 A | * | 6/1995 | Schreiber | 361/166 |
| 5,763,959 A | * | 6/1998 | Chambers | 307/20 |
| 5,923,103 A | * | 7/1999 | Pulizzi et al. | 307/126 |
| 5,949,974 A | * | 9/1999 | Ewing et al. | 709/202 |
| 6,011,329 A | * | 1/2000 | McGovern | 307/141.4 |
| 6,628,009 B1 | * | 9/2003 | Chapel | 307/14 |
| 6,741,442 B1 | * | 5/2004 | McNally et al. | 361/166 |
| 7,141,891 B2 | * | 11/2006 | McNally et al. | 307/39 |
| 7,446,437 B2 | * | 11/2008 | Paik et al. | 307/115 |
| 7,550,870 B2 | * | 6/2009 | Reynolds et al. | 307/32 |
| 7,718,889 B2 | * | 5/2010 | Rasmussen et al. | 174/50 |
| 7,973,425 B2 | * | 7/2011 | Chen | 307/12 |
| 2002/0002593 A1 | | 1/2002 | Ewing et al. | |
| 2002/0189848 A1 | * | 12/2002 | Hawker et al. | 174/149 B |
| 2005/0052814 A1 | * | 3/2005 | McNally et al. | 361/166 |
| 2005/0146219 A1 | | 7/2005 | Pincu et al. | |
| 2006/0082222 A1 | | 4/2006 | Pincu et al. | |
| 2007/0136453 A1 | * | 6/2007 | Ewing et al. | 709/223 |
| 2009/0225480 A1 | * | 9/2009 | Baxter | 361/42 |
| 2010/0020475 A1 | * | 1/2010 | Spitaels et al. | 361/656 |
| 2011/0320834 A1 | * | 12/2011 | Ingels et al. | 713/310 |

FOREIGN PATENT DOCUMENTS

WO    2006136820 A2    12/2006

OTHER PUBLICATIONS

International Search Report for PCT/US2010/050819 mailed Jun. 28, 2011.

* cited by examiner

*Primary Examiner* — Rexford Barnie
*Assistant Examiner* — Justen Fauth
(74) *Attorney, Agent, or Firm* — Lando & Anastasi, LLP

(57) ABSTRACT

A method of optimizing power loads of a power strip is disclosed. The power strip is of the type having single or three phase power input, a plurality of circuit breakers, and a plurality of outlets. The arrangement is such that at least one circuit breaker is associated with at least one outlet. The method includes: obtaining real-time current measurements for each phase of the single or three phase power input of the power strip; obtaining real-time current measurements for each circuit breaker of the plurality of circuit breakers of the power strip; logging the real-time current measurements for each phase of the single or three phase power input and for each circuit breaker of the plurality of circuit breakers; and analyzing the real-time current measurements of the single or three phase power input and the plurality of circuit breakers to determine a preferential order of outlets in which to apply a new load.

17 Claims, 4 Drawing Sheets

SYSTEMS AND METHODS FOR OPTIMIZING POWER LOADS IN A POWER DISTRIBUTION UNIT

BACKGROUND OF THE DISCLOSURE

1. Field of the Disclosure

The present disclosure generally relates to improvements to a power distribution system and method, and more particularly to advanced power calculations and user interfaces to improve reliability and energy efficiency of a power distribution system, such as an intelligent power strip, and user or operator interaction with such a system.

2. Discussion of Related Art

Intelligent rack-mounted power distribution units, sometimes referred to as "rack PDUs," may include at least one branch input power feed, single or three phase, with multiple receptacles to power attached equipment. Rack PDUs often include metering functions to measure and calculate voltage, current, power, and environmental data as well as a processor, memory and network management device for remote communication and management. Historically, rack PDUs measure aggregate load data based on phases and/or breaker banks, most often feeding multiple receptacle outputs. New generations of rack PDUs may now include metering loads at each individual receptacle output. An exemplary rack PDU is disclosed in U.S. Pat. No. 6,741,442, which is assigned to American Power Conversion Corporation of West Kingston, R.I., the assignee of the present disclosure, which is incorporated herein by reference in its entirety for all purposes.

For example, FIG. 1 illustrates a known power distribution unit, generally indicated at 10, having a vertical mount form factor suitable for mounting within a typical equipment rack (not shown). As shown, the power distribution unit 10 is connected to a 3-pole branch circuit breaker 12 having three phases L1, L2, L3. In other embodiments, the power distribution unit 10 may have a single phase L1. The branch circuit breaker 12 feeds power to the power distribution unit 10, which may be configured to have several sub-branch breakers, which are identified as B1, B2, B3, B4, B5, B6. In the shown example, an input branch circuit feed 14 is 3-phase. In a 208 Volt example, the input branch circuit feed 14 is broken down into six breaker banks having outlet receptacles, identified by reference number 16, with an outlet number identifier associated with the reference number. The arrangement is such that each 2-pole branch circuit breaker (B1, B2, B3, B4, B5, B6) of the power distribution unit 10 is fed by two of the incoming phases and feeds one or more outlet receptacles 16 at 208 Volts. In the shown example, the power distribution unit 10 includes six branch circuit breakers, each having two outlet receptacles. Thus, the power distribution unit 10 includes twelve outlet receptacles 16, which may be connected to IT loads, such as servers. Current is measured by a sensor associated with the branch circuit breaker 12 for each incoming branch circuit breaker phase (L1, L2, L3) and a sensor associated with each circuit breaker (B1, B2, B3, B4, B5, B6) on the rack power distribution unit.

Real-time measurements may be displayed locally by a local user display 18, which is illustrated separately from the power distribution unit 10 in FIG. 1. Presently available rack power distribution units provide the raw metered data, which may be fed to external data logs or software programs to help users calculate the information necessary to make upgrade, planning, worst case, or reliability calculations. However, none of these rack power distribution units provide feedback to the operator incorporating the historical current measurements of the single or three phase input and the circuit breakers to improve the management and efficiency of the rack power distribution units in applying new loads to the power distribution unit.

SUMMARY OF THE DISCLOSURE

An aspect of the disclosure is directed to a method of optimizing power loads in a power strip of the type having single or three phase power input, a plurality of circuit breakers, and a plurality of outlets. The arrangement is such that at least one circuit breaker is associated with at least one outlet. In one embodiment, the method comprises: obtaining real-time current measurements for each phase of the single or three phase power input of the power strip; obtaining real-time current measurements for each circuit breaker of the plurality of circuit breakers of the power strip; logging the real-time current measurements for each phase of the single or three phase power input and for each circuit breaker of the plurality of circuit breakers; and analyzing the real-time current measurements of the single or three phase power input and the plurality of circuit breakers to determine a preferential order of outlets in which to apply a new load.

Embodiments of the method may further comprise displaying the preferential order of outlets on a display, sending the preferential order of outlets over a communication network to the display and/or identifying whether a particular outlet of the plurality of outlets is occupied. Analyzing the real-time current measurements of the single or three phase power input and the plurality of circuit breakers may comprise identifying the maximum allowable additional load. Identifying the maximum allowable additional load may include determining the minimum of the following: a rating of a breaker bank of the rack power distribution unit minus data log maximum logged value for the breaker; a maximum allowable load on a first feed phase line to the breaker bank or outlet minus data log maximum logged value for that first phase line; a maximum allowable load on a second feed phase line to the breaker bank or outlet minus data log maximum logged value for that second feed phase line; and a maximum amps for the outlet. Analyzing the real-time current measurements of the single or three phase power input and the plurality of circuit breakers comprises identifying a user preference between preventing an overload of one of the plurality of circuit breakers and balancing a phase load of the single or three phase power input when employing three phase power input.

Another aspect of the disclosure is directed to a computer readable medium having stored thereon sequences of instruction including instructions that will cause a processor to: obtain real-time current measurements of each phase of a single or three phase power input of a power strip; obtain real-time current measurements of each circuit breaker of a plurality of circuit breakers of the power strip; log the real-time current measurements each phase of the single or three phase power input and each circuit breaker of the plurality of circuit breakers; and analyze the real-time current measurements of the single or three phase power input and the plurality of circuit breakers to determine a preferential order of outlets in which to apply a new load.

Embodiments of the computer readable medium may further comprise configuring the processor to send the preferential order of outlets to a display. The processor may be further configured to send the preferential order of outlets to the display over a communication network. The processor may be further configured to, when analyzing the real-time current measurements of the single or three phase power input and the plurality of circuit breakers, identify the maximum allowable additional load. The processor may be further configured to, when identifying the maximum allowable additional load, determine the minimum of the following: a rating of a breaker bank of the rack power distribution unit minus data log maximum logged value for the breaker; a maximum allowable load on a first feed phase line to the breaker bank or outlet minus data log maximum logged value for that first phase line; a maximum allowable load on a second feed phase line to the breaker bank or outlet minus data log maximum logged value for that second feed phase line; and a maximum amps for the outlet. The processor may be configured to, when analyzing the real-time current measurements of the single or three phase power input and the plurality of circuit breakers, identify a user preference between preventing an overload of one of the plurality of circuit breakers and balancing a phase load among the single or three phase power input when employing three phase power input. The processor may be configured to identify whether a particular outlet of the plurality of outlets is occupied.

Yet another aspect of the disclosure is directed to a power strip comprising single or three phase power input, a plurality of circuit breakers in communication with the single or three phase power input, and a plurality of outlets. The arrangement is such that at least one circuit breaker is associated with at least one outlet. The power strip further comprises a controller configured to analyze the real-time current measurements of the single or three phase power input and the circuit breakers to determine a preferential order of outlets in which to apply a new load.

Embodiments of the power strip may further comprise a display to display the preferential order of outlets and/or a communication network to send the preferential order of outlets over. The processor may be further configured to obtain real-time current measurements of each phase of the single or three phase power input of the power strip, obtain real-time current measurements of each of the plurality of circuit breakers of the power strip, and log the real-time current measurements of each phase of the single or three phase power input and the circuit breakers. The processor, when analyzing the real-time current measurements of each phase of the single or three phase power input and the circuit breakers, identifies a user preference between preventing an overload of one of the plurality of circuit breakers and balancing phase load of the single or three phase power input when employing three phase power input. The power strip may further comprise a sensor to identify whether a particular outlet of the plurality of outlets is occupied.

The present disclosure will be more fully understood after a review of the following figures, detailed description and claims.

BRIEF DESCRIPTION OF THE DRAWINGS

In the drawings, each identical or nearly identical component that is illustrated in various figures is represented by a like numeral. For purposes of clarity, not every component may be labeled in every drawing. For a better understanding of the present disclosure, reference is made to the figures which are incorporated herein by reference and in which.

DETAILED DESCRIPTION OF THE PREFERRED EMBODIMENTS

Figure 1:
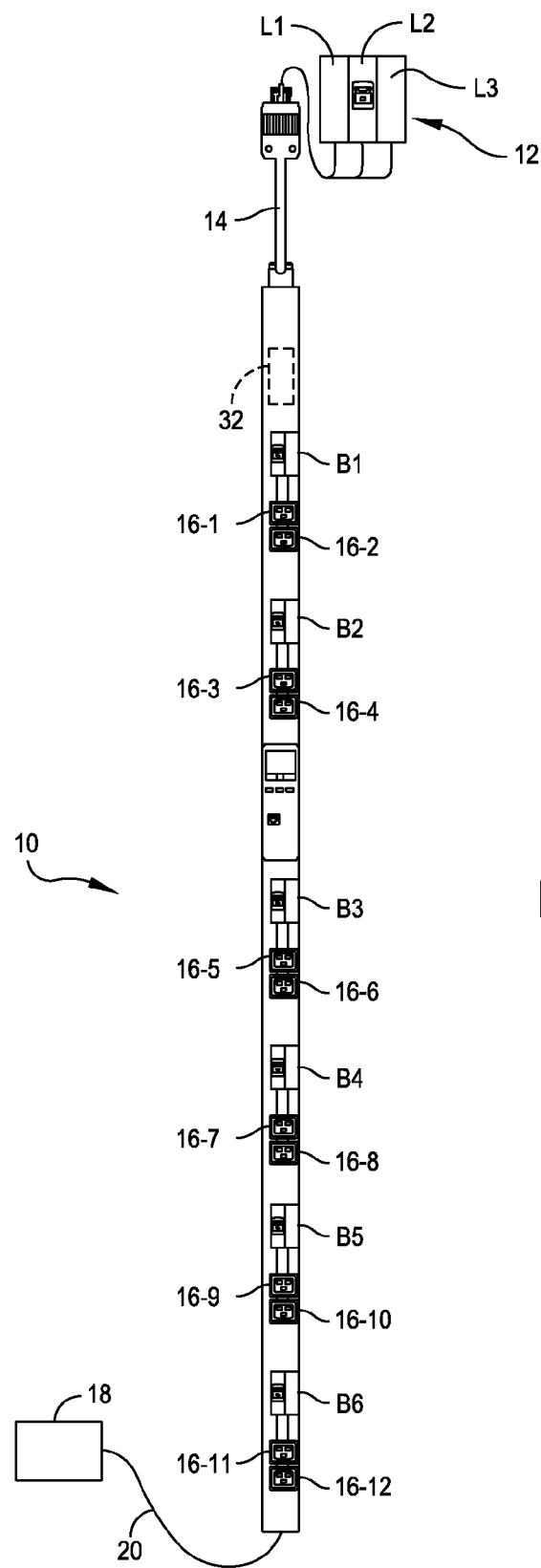
FIG. 1 is an example of a power distribution unit.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The disclosure is capable of other embodiments and of being practiced or being carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

In accordance with several embodiments of the present disclosure, a power distribution unit is set forth that may provide electrical power and power management to one or more computer systems and their related peripheral devices. The power distribution unit may embody a power strip configured to include internal power management circuitry and external power outlet receptacles. The power strip may operate in conjunction with power management procedures, within the scope of the present disclosure, to provide a power management system for conventional computer systems provided in a rack equipment environment. The power management system may be implemented on a general purpose computer system having rack-mounted equipment to provide that computer system with automatic and/or user programmable power management features.

Exemplary applications of the systems and methods disclosed herein may be used to determine how and/or where to attach equipment power connections into rack power distribution units (either individual outlet or outlet group) for optimal efficiency by balancing incoming power phases in single or three phase input rack power distribution units, for example. The systems and methods may be further used to determine how and/or where to attach equipment power connections into rack power distribution units to balance loads across multiple circuit breaker banks (either individual outlet or outlet group) in order to reduce the probability of overloading circuit breakers, and thus improve the reliability of the system.

In certain embodiments, each rack power distribution unit may be configured to communicate with an upstream feeder distribution panel and/or an external device, including other rack power distribution units, to gather data which may include real-time or historic use data. Such data may be used to perform calculations to determine if there is sufficient power available to the rack power distribution unit for providing power to additional rack-mounted devices. In other embodiments, each rack power distribution unit allows users to configure groups of outlets within the rack power distribution unit based on outlet data with other rack power distribution units. The rack power distribution unit may be configured to collect power data for groups of outlets attached to power attached equipment, i.e., in redundant power configurations, in order to provide aggregate power usage by a piece of equipment or groups of equipment utilizing the same multiple rack power distribution units for power distribution.

Other embodiments may be directed to providing a user interface, both by remote device communication methods with a network or by serial communication methods, and/or by a display built into the rack power distribution unit, and/or an external display attached to the rack power distribution unit, and/or by signaling devices embedded into the rack power distribution unit itself, to display information regarding the recommendations, warnings, and/or other information based on this new information to the user.

The systems and methods disclosed herein are intended, in part, to automate a selection process for determining which outlet receptacle(s) and/or bank of receptacle(s) to plug in one or more new or additional pieces of equipment in order to best balance three phases for optimal load balancing and for preventing circuit breaker overload. This balancing is designed to improve efficiency and/or to balance maximum load per breaker bank on the rack power distribution unit to reduce the probability of circuit breaker overload and to improve reliability. This process may include using real-time and/or historic and/or logged measurement data on the rack power distribution unit with an algorithm, optionally based on user input preferences; e.g., real-time or historic data, to determine the optimal configuration. Specifically, in one embodiment, the systems and methods may include an process that compares real-time and historic log power data to determine how to configure attached equipment loads to best balance loads across 3-phases or multiple breaker banks for maximum power efficiency and reliability.

For rack power distribution units with power metering by an individual outlet, an process may be provided to evaluate historic and real-time data to suggest changes in which receptacle loads are attached to in order to optimize load balancing for energy efficiency and maximum system reliability. A network communication may be provided to collect power data from upstream power feed circuits to determine if additional power exists upstream to power additional connected loads to the rack PDU. Such a network communication may be configured to collect real-time data and/or calculate loads and capacity based on historic averages and/or maximum consumption data.

Embodiments of the disclosure may include a method to communicate by a network or a serial interface to additional rack power distribution unit(s) in order to collect real-time and historic power data (by outlet receptacle or aggregate). Such a method may be designed to process and display the total power characteristics for attached equipment, which may be fed by multiple outlet receptacles on multiple rack power distribution units to illustrate aggregate loads on multiple outlet receptacles within a single power distribution unit or multiple power distribution units. The system and methods disclosed herein may further calculate the total load on redundant rack power distribution units if a source of one of the power distribution units is lost and a single power distribution unit must power the full load of all attached equipment. This process may warn the user or operator if the remaining rack power distribution unit is able to provide the necessary power to the attached devices without overloading circuits and risking dropped loads. An easy to use output of the calculated data and/or recommendations may be shown to the operators by a variety of optional interfaces, which may include one or more of the following: (a) a user display built into the rack power distribution unit, such as an LCD or LED display; (b) an LED or other signal device identifying each outlet receptacle and optionally which is best to plug new load into; (c) a network or serial connection method, which could be SNMP, web interface; or (d) any other communication method, e.g., a network management card.

Many users or operators do not consider the optimal location to attach additional loads to existing rack power distribution units and risk unbalanced loading, which may result in less efficient power delivery (unbalanced loading) and/or risk of circuit breaker overloads during peak consumption periods and/or loss of source in a redundant power delivery design. In a redundant power delivery configuration, users may not be calculating or considering the power capacity of the rack power distribution units during a source loss situation. Such an oversight may result in circuit overloads and dropped power during these events.

Some users or operators may utilize rack the power distribution unit power measurement data from existing rack power distribution units from a user display on the rack power distribution unit and/or external user interface or data log of embodiments of the present disclosure. Prior systems and methods required users to either manually calculate the optimal configurations or to use an external software tool to determine these configurations as described above. In such prior systems and methods, users manually recorded this configuration and implemented the required upgrades or changes at the rack power distribution unit with this information. This process was time consuming and/or required multiple users to collect data, perform calculations, and provide recommendations.

Reference may be made to FIG. 1, which is discussed above and illustrates an exemplary power distribution unit. Another embodiment is provided in U.S. Pat. No. 6,741,442, which discloses another exemplary power strip. In U.S. Pat. No. 6,741,442, the power strip includes an elongated rectangular housing, which has a first end and a second end. The housing may further include a plurality of externally accessible AC power outlets, through which one or more computers or servers and their related peripherals, if any, receive power. The power outlets may be mounted along a longitudinal length of one face of the housing. A number of mounting brackets may be coupled to the housing to enable the housing to be mounted to an equipment rack.

The first end of the housing may include a number of apertures, which may be adapted to permit power and signal conductors to enter an internal region of the housing. The second end of the housing may include a plurality of externally accessible communication ports. In an embodiment, a first communication port is adapted to permit an external control device, such as computer system, to communicate with the power management circuitry defined in the housing. A second communication port, defined on the second end of the housing, is adapted to permit the power management circuitry to communicate with one or more external devices. The external devices may be one or more intelligent power strips, which may be daisy chained together.

In a particular embodiment, the power management circuitry, which is positioned in the interior region of the housing of the power strip, includes a current sensor circuit. The current sensor circuit receives AC input power over an AC input power line from an AC power source through a branch circuit breaker.

The power distribution unit of embodiments of the disclosure may further include a processor to control the operation of the power distribution unit.

Presently, a typical metered (or switched) rack power distribution unit interface displays the real-time measurement for each of the incoming phase currents (L1, L2, L3) and each of the branch circuit breakers in the power distribution unit itself. For example, FIG. 1 illustrates each of the six branch circuit breakers B1, B2, B3, B4, B5, B6 and twelve outlet receptacles 16-1 to 16-12 associated with the power distribution unit 10. If the outlet receptacles numbered 16-1, 16-3, 16-5, 16-7, 16-9 and 16-11 each have a connected load, then each of the branch circuit breakers B1, B2, B3, B4, B5, B6 has a corresponding current load to be measured. Each branch circuit breaker B1, B2, B3, B4, B5, B6 has a maximum current rating, which is typically 20 amps in North America. However, the 20 amp maximum rating is de-rated by twenty percent to maximum current rating of 16 amps.

Figure 2:
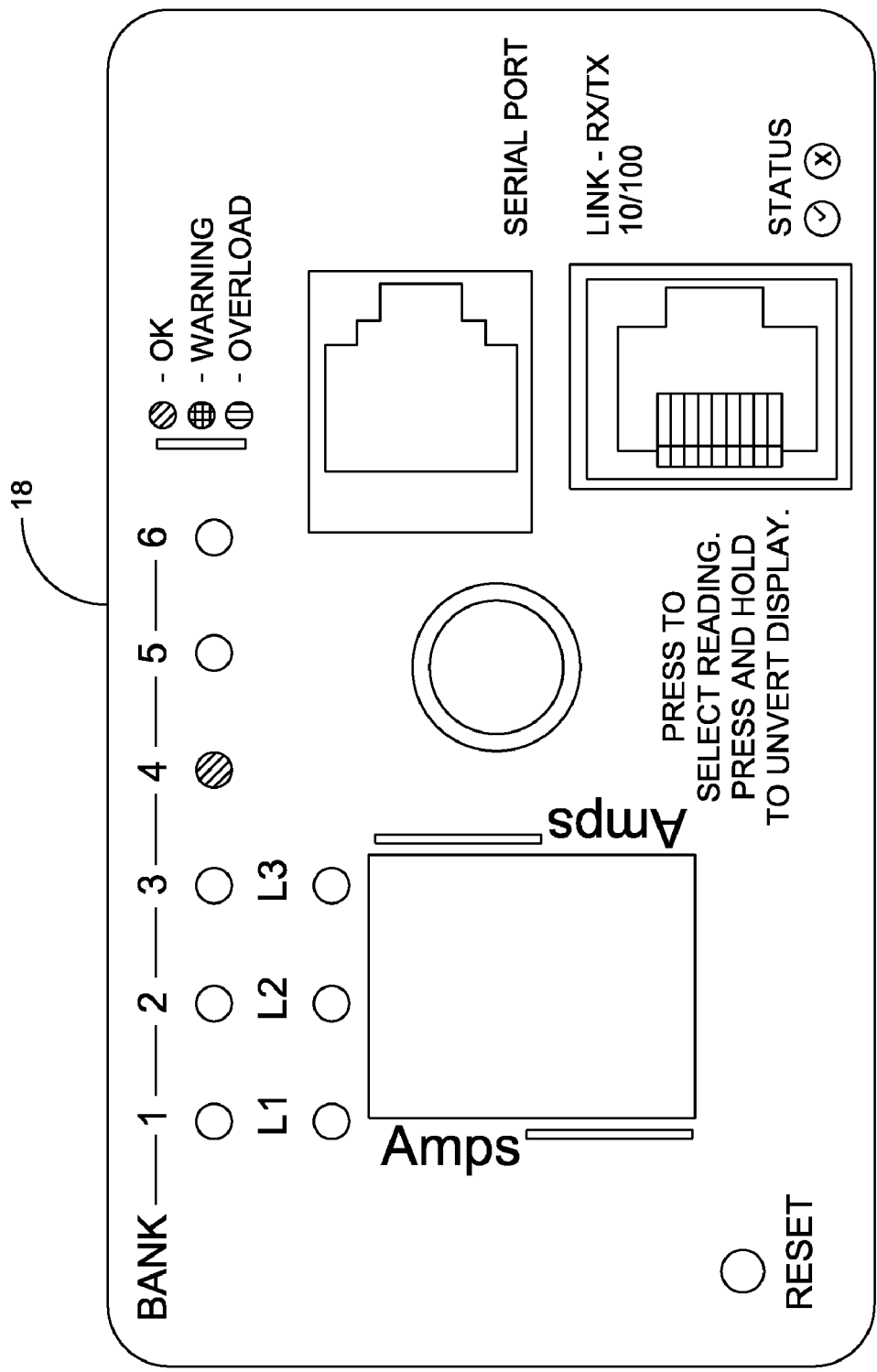
FIG. 2 is an alternate embodiment of a user interface, which may be used on the power distribution unit shown in FIG. 1.

If an operator wants to add an additional piece of equipment to the rack power distribution unit 10, the operator is presently able to visually look at the rack power distribution unit interface or display 18 and determine the real-time phase currents and branch circuit breaker currents. A typical display 18 is shown with reference to FIG. 2. Such a display 18 may be provided on the power distribution unit 10 or located separately from the power distribution unit, in which case communication is provided between the display and the power distribution unit. For example, communication may be represented by line 20, which may embody a cable or a network. As shown in FIG. 2, the "AMPS" display illustrates a real-time current measurement corresponding to one of the phases or branch circuit breakers when an LED indicator light is illuminated. As shown, breaker bank no. "4" is shown illuminated in the example display. In some embodiments, the display output indicates the real-time measurements for multiple phases and/or breaker banks simultaneously.

Prior to the instant disclosure, in order to choose the most practical outlet receptacle to plug the new load into, the operator would make a manual determination of the best breaker bank/receptacle to use for the new additional load. For example, if the operator was provided with the following data:

TABLE 1

| | Load (Amps) |
|---|---|
| Breaker | |
| B1 | 13.4 |
| B2 | 9.4 |
| B3 | 10.5 |
| B4 | 11.1 |
| B5 | 9.3 |
| B6 | 8.2 |
| Phase | |
| L1 | 23.8 |
| L2 | 25.6 |
| L3 | 23.1 | and, if the new load requires 5.4 Amps current, then the operator would likely examine the real-time measurement data provided in Table 1 and choose to power the new piece of equipment from breaker bank B6, outlet number 16-12, as this results in the expected new total maximum load (i.e., 8.2 Amps+5.4 Amps) for the rack power distribution breakers as well as the phase loads since B6 is fed by L1 and L3.

Thus, the operator would manually calculate the expected totals after the new load is added as follows:

TABLE 2

| Breaker | Load (Amps) |
|---|---|
| B1 | 13.4 |
| B2 | 9.4 |
| B3 | 10.5 |
| B4 | 11.1 |
| B5 | 9.3 |
| B6 | 8.2 + 5.4 = 13.6 | and, based on the information provided to the operator, the selection of B6, outlet 16-12 would be the most logical choice of power connectivity since L1 and L3 both have lower real-time phase currents and B6 has the lowest current load of all breakers (particularly fed by L1 and L3).

However, according to the present disclosure, using real-time data to make power connectivity decisions is or is most likely misleading. IT equipment power usage is not typically very constant. The increasing use of virtualized servers and consolidation of IT equipment results in dramatically variable power consumption over time. For the example provided above, if the historical data from the power distribution unit was as follows for a predetermined data log time frame (typically 1 month or greater):

TABLE 3

| | Load (Amps) | Max Measured (Amps) | Ave. Measured (Amps) |
|---|---|---|---|
| Breaker | | | |
| B1 | 13.4 | 15.2 | 9.5 |
| B2 | 9.4 | 11 | 8.6 |
| B3 | 10.5 | 10.2 | 8 |
| B4 | 11.1 | 9.9 | 9.1 |
| B5 | 9.3 | 16.4 | 13.4 |
| B6 | 8.2 | 15.7 | 12.7 |
| Phase | | | |
| L1 | 23.8 | 33.7 | 25.5 |
| L2 | 25.6 | 26.7 | 20.3 |
| L3 | 23.1 | 30.1 | 24.9 | then the operator, by making decisions based on real-time data, would not consider typical or maximum load conditions. If the operator had knowledge of the maximum measured amps and average or typical load of the breaker B6, the operator may have made a different power connectivity choice for the additional piece of equipment. In this example, the additional of a 5.4 A (expected load) device to the breaker bank B6 would result in an expected average load of 18.1 Amps (12.7 Amps+5.4 Amps) for this particular branch circuit breaker. Thus, the expected average load is much higher than the rating of 16 Amps. Additionally, the circuit may be at risk for overload tripping since the maximum historic measured value of 15.7 Amps in addition to the 5.4 Amps from the additional piece of equipment would equal 21.1 Amps, thus exceeding the nominal total breaker trip characteristic of 20 Amps. Further, the expected average and maximum peak load per phase would be further unbalanced by the choice of breaker B6 as this would increase the average load of phases L1 and L3 (the two highest average load phases).

Figure 3:
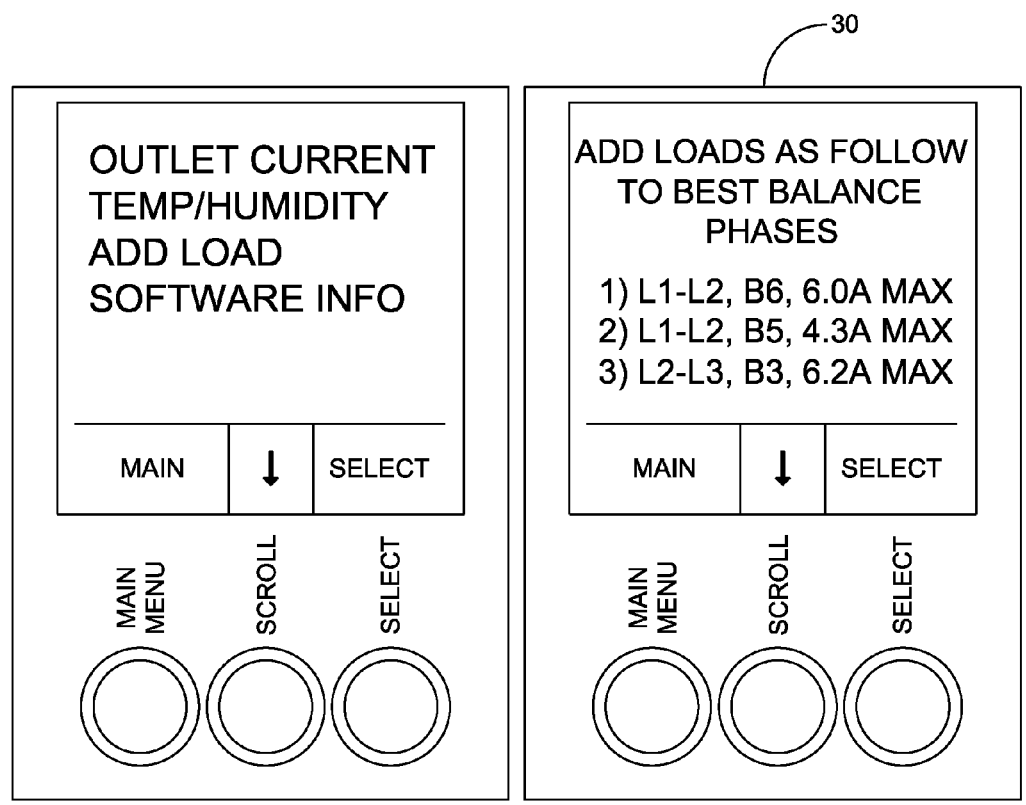
FIG. 3 is a view showing a display of the user interface.

In one embodiment of the disclosure, the rack power distribution unit 10 has a user configurable network management interface, such as the interface or display 30 shown in FIG. 3, which allows the operator to define alarm threshold levels for each phase and each breaker bank. The user configurable network management interface 30 allows the operator to customize the maximum desired current for each phase L1, L2, L3 and branch circuit breaker B1, B2, B3, B4, B5, B6 with consideration for site specific conditions (e.g., single or dual power feeds to IT equipment, risk of overload downtime, desired safety factor, etc.).

In order to allow operators to access the historical data logs stored in the memory of each rack power distribution unit as described above, the systems and methods of the present disclosure include data analysis capability provided to an embedded rack power distribution unit processing module 32 (see FIG. 1) and the display (e.g., display 30) to output the calculated responses to the local operator for installation and/or power connectivity decisions at the rack power distribution unit. In a certain embodiment, the onboard data log and calculations may include, at minimum, a data log that stores the current measurements by phase, breaker bank, and/or individual outlet at a time interval which can be factory defined or user selected (typically one-minute intervals).

In another embodiment, at the rack power distribution unit level, it may be desirable to balance loads (i.e., make them as equal as possible) across the three incoming phases (L1, L2, L3) for efficiency and maximum safety factor. In typical 208 Volt systems, the rack circuit breakers or outlet banks (in cases in which the circuit breakers are not required) are fed by 2-pole breakers connected to two incoming phases (L1-L2, L2-L3, L3-L1). In order to best balance loads, the process of embodiments of the disclosure examines the average phase load for each phase in the data log, and ranks the order of the average current load from the smallest to the largest. For example, if average current for L1=12 A, L2=16 A, L3=8 A, then the order would be L3, L1, L2. The desired order of connecting new output loads would be: L3-L1 most favorable, L2-L3 second most favorable, L1-L2 least favorable.

The power distribution unit processor 32 then calculates, for each rack power distribution circuit breaker bank B1, B2, B3, B4, B5, B6 (or phase bank for case where no breakers are used on the rack power distribution unit) and/or individual receptacle 16-1 to 16-12, the maximum allowable additional load, which equals the minimum of the following:
(1) the rack power distribution unit breaker bank rating in Amps (as defined in firmware setup by factory default or user customized) minus data log maximum logged value for the breaker;
(2) the maximum allowable load on first feed phase line (i.e., L1, L2, or L3) to the breaker bank or outlet as calculated by the maximum phase Amps (as defined in firmware setup by factory default or user customized) minus the data log maximum logged value for that phase;
(3) the maximum allowable load on second feed phase line (i.e., L1, L2, or L3) to the breaker bank or outlet as calculated by the maximum phase amps (as defined in firmware setup by factory default or user customized) minus the data log maximum logged value for that phase; and
(4) the maximum amps for the outlet (as defined in firmware setup by factory default or user customized).

The process may optionally be repeated using the arithmetic mean or median data in place of the maximum recorded current data from the same data log. The operator may then optionally decide to utilize the average data in place of the maximum recorded data to make a decision.

The process may be continuously repeated on some factory- or user-defined interval and logged into the data log by breaker and/or receptacle, or the process may be run in real time when prompted to do so by the local operator when selected from the user interface and display options designed into the rack power distribution unit.

From the foregoing example, if L3-L1 is most favorable, L2-L3 is second most favorable, and L1-L2 is least favorable, and the maximum allowable load by breaker is:
  B1: 5.2 A max headroom (connected to L1-L2)
  B2: 7.1 A max headroom (connected to L1-L2)
  B3: 6.2 A max headroom (connected to L2-L3)
  B4: 4.3 A max headroom (connected to L2-L3)
  B5: 4.3 A max headroom (connected to L3-L1)
  B6: 6.0 A max headroom (connected to L3-L1)
then, the operator recommendation output would follow depending on the operator goal, which could be (1) to best balance loads, or (2) to stay under the maximum allowable additional load (i.e., maximum headroom). In certain instances, operators may want to best balance loads for achieving the most efficient system. However, there may be circumstances in which the order could be different to obtain the maximum allowable additional load, if necessary.

Next, the systems and methods disclosed herein rank the phase pairs as determined earlier, then rank the breakers connected to those phases from highest headroom to lowest within the phase pair groupings. For this example, by ranking order for best balanced load, the following is found:
  (1) L3-L1
    a. Breaker B6=6.0 A max
    b. Breaker B5=4.3 A max
  (2) L2-L3
    a. Breaker B3=6.2 A max
    b. Breaker B4=4.2 A max
  (3) L1-L2
    a. Breaker B2=7.1 A max
    b. Breaker B1=5.2 A max
In one embodiment, the operator may interact with the user interface, such as the user interface 30 shown in FIG. 3, which includes an LCD display, user selection buttons, a menu on LCD, and output of the selection.

Next, when ranking the breakers connected to those phases from highest headroom to lowest within the phase pair groupings, the following is achieved:
  B2: 7.1 A max headroom (connected to L1-L2)
  B3: 6.2 A max headroom (connected to L2-L3)
  B6: 6.0 A max headroom (connected to L3-L1)
  B1: 5.2 A max headroom (connected to L1-L2)
  B4: 4.3 A max headroom (connected to L2-L3)
  B5: 4.3 A max headroom (connected to L3-L1)
Some rack power distribution units may be configured to have the ability to recognize if outlets have a load connected. A sensor associated with circuit breakers B1, B2, B3, B4, B5, B6 or with outlets 16-1 to 16-12 may be provided to perform this function. The logic can check if there is an empty (non-connected) outlet on each bank and exclude any bank without empty outlets available from the output above. Furthermore, for breaker banks or outlet groups including outlets with different ratings, the connectivity scheme could be amended to output data on an outlet level basis rather than breaker bank level.

Figure 4:
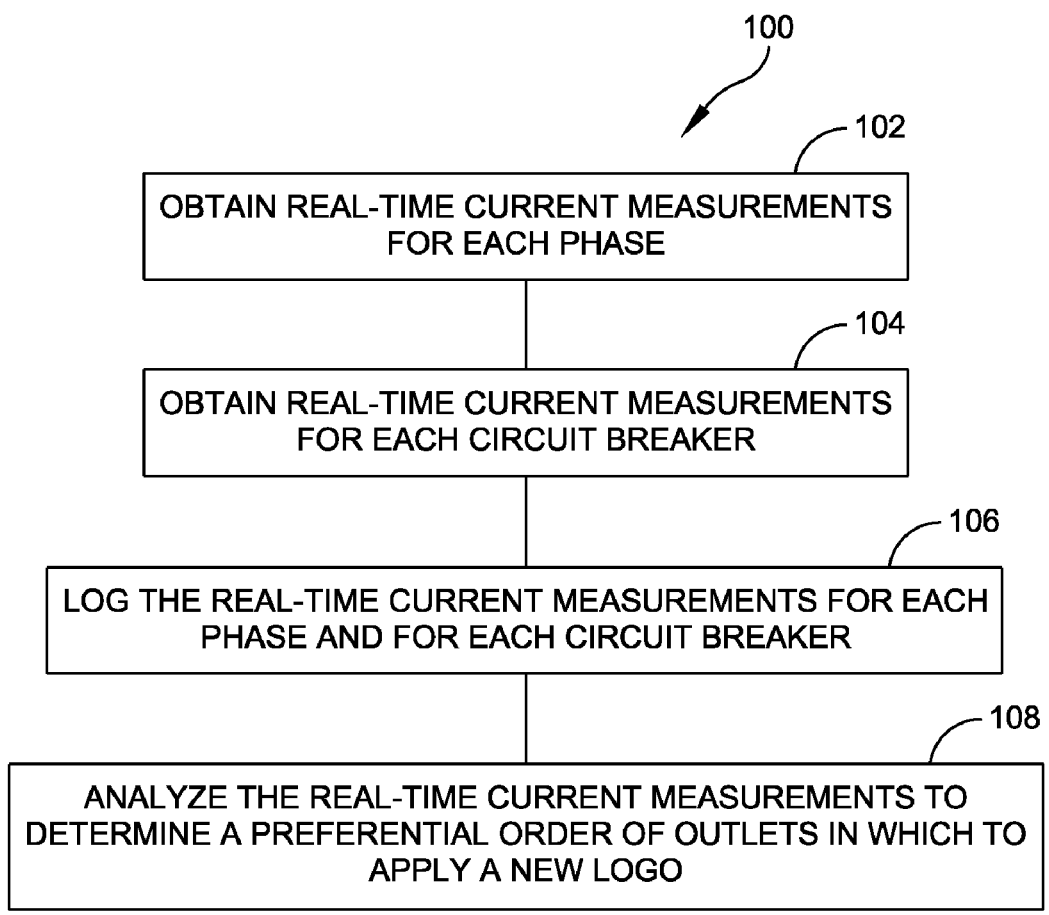
FIG. 4 is a flow chart illustrating a method of optimizing power loads in a power strip.

Referring to FIG. 4, a method of optimizing power loads in a power strip having three phase power input, a plurality of circuit breakers, and a plurality of outlets is generally indicated at 100. In one embodiment, the method comprises obtaining real-time current measurements for each phase of the three phase power input of the power strip at 102. A sensor associated with the branch circuit breaker may be provided to obtain the current information. The method further includes obtaining real-time current measurements for each circuit breaker at 104. Again, one or more sensors may be provided to obtain this current information. The method further includes logging the real-time current measurements for each phase of the three phase power input and for each circuit breaker at 106. Such logging of data may be achieved by processor 32. Once logged, the method further includes analyzing the real-time current measurements of the three phase power input and the plurality of circuit breakers to determine a preferential order of outlets in which to apply a new load at 108.

To enable the operator or user to quickly and efficiently select a particular circuit breaker to apply the new load, the method may further include displaying the preferential order of outlets on a display. In some embodiments, the display may be associated with the power distribution unit; however, with embodiments not having such a display, the method may include sending the preferential order of outlets over a communication network to a separate display. Other embodiments of the method may further include identifying whether a particular outlet of the plurality of outlets is occupied.

In certain embodiments, when analyzing the real-time current measurements of the three phase power input and the circuit breakers, the method further includes identifying the maximum allowable additional load. To achieve the identification of the maximum allowable additional load, the method may include determining the minimum of the following: (a) a rating of a breaker bank of the rack power distribution unit minus data log maximum logged value for the breaker; (b) a maximum allowable load on a first phase line to the breaker bank or outlet minus data log maximum logged value for that first phase line; (c) a maximum allowable load on a second feed phase line to the breaker bank or outlet minus data log maximum logged value for that second phase; and (d) a maximum amps for the outlet. In other embodiments, when analyzing the real-time current measurements of the three phase power input and the circuit breakers, the method may further include identifying a user preference between preventing an overload of one of the plurality of circuit breakers and balancing a phase load when employing the three phase power input.

As mentioned, rack power distribution units may also communicate by a network management card to network attached computers so that remote users can also display the calculated data by the remote interface methods including, but not limited to the web interface and SNMP communication methods, or via a 3rd party software solution communicating to the rack power distribution unit by serial, Ethernet, wifi, or other means. Optionally, Rack power distribution units may communicate with upstream software or external data log to obtain either additional information (i.e., historical loads by phase, breaker, and/or receptacle) or user preferences (i.e., user customizable load limits, ratings, etc.) and use this data as part of the automated calculation routines.

Optionally, rack power distribution units may communicate with upstream software or other hardware devices, such as feeder power distribution units, which feed the 3-phase power to the rack power distribution unit, to evaluate the available current loads in those devices, and/or use to better balance overall 3-phase loading globally across many rack power distribution units that are fed from the same power panel or power distribution feed.

Similar processes may be applied to different input power distribution systems, including standard International 220-240 Volt systems (phase to neutral) and 100-125 Volt North America and Japan systems (phase to neutral).

An exemplary rack power distribution unit may include embedded sensors to measure power data, a network management device to communicate with external devices including other rack power distribution units, and computer processing to perform calculations on the measured and collected data. In certain embodiments, the rack power distribution unit may include an embedded display or communication ports to communicate to an attached display to output the information calculated to the user.

In certain embodiments, the rack power distribution unit measures and records current, voltage, and power calculations by aggregate banks by phase and/or breaker bank. Some rack power distribution units may also be configured to measure these attributes for each individual outlet and may add these individual data points to calculate the aggregate breaker bank and/or phase loads. This data may be recorded in a local memory file at some configurable time range. The rack power distribution unit may also, in certain embodiments, use network communication protocols to communicate with external devices and/or software to collect necessary data as input for calculations. The rack PDU may be configured to record any of these data records as input to the mathematical algorithms to optimize the configuration and output recommendations to the user. The rack power distribution unit may be further configured to include new processing routines that are embedded in the rack power distribution unit to take the measurement data including real time, memory logged, and/or external data inputs as input to the process to make calculations and output the recommendations described above via the network management card and/or the user display interface.

The systems and methods disclosed herein may be utilized on any power distributing device having multiple groups of circuit breakers or single or three phase power input with single phase power output.

Thus, it should be observed that the systems and methods disclosed herein may provide an automated, easy to use, on location (e.g., by providing the display at the rack power distribution unit) set of embedded calculations, comparisons and associated recommendations for the user to maximize efficiency and increase system reliability. Embodiments may include a customer configurable set of variables and/or limits to consider in performing the automated calculations in order to provide customer the maximum flexibility in using the automated tools in a way that matches their desired level of safety. The systems and methods may further provide comprehensive checks of available power, consider historic and/or real-time (i.e., maximum and/or average loading information) data, and consider power source losses in redundant systems, as well as the user configurable maximum load thresholds to ensure the user or operator configures attached loads for maximum robustness and conformity to the user policy preferences to minimize probability of overload and dropped loads.

The embedded algorithms and calculations of data disclosed herein may be configured to provide recommendations for optimal configuration of power connections of attached equipment and other recommendations as described herein. Embodiments may include utilizing communication methods from external devices. Such external devices may include other rack power distribution units, other hardware (e.g., remote power panels or feeder power distribution units), and/or other external software, such as APC Infrastructure Central offered by American Power Conversion Corporation of West Kingston, R.I., or third party applications, and processing of this data embedded into the rack power distribution unit itself to provide user recommendations and/or calculated data based on the external information and the data collected within the rack power distribution unit itself. Embodiments further include a display built into the rack power distribution unit, such as LCD, LED, or other type of display, and any associated user interface which may be interactive to display these recommendations real time to a user at the rack power distribution unit. Alternative embodiments may include an optional external display connected directly to the rack power distribution unit, such as LCD, LED, or other type of display, and any associated user interface which may be interactive to display these recommendations real-time to a user at the rack power distribution unit. Methods to transmit this data to remote locations via the embedded web interface, SNMP, serial, or any other communication method of the information processed in the rack power distribution unit to other devices may further be provided.

In certain embodiments, the measurements may be logged in an embedded memory of a network management card of the power distribution unit, for example, for data analysis purposes. Operators may utilize the measurement data, particularly the current and power data, in order to achieve certain performance improvements. For example, such measurement data may be used to monitor the current draw to avoid circuit overloads. Another use for measurement data may be to track power usage for capacity or cooling planning.

Having thus described at least one illustrative embodiment of the disclosure, various alterations, modifications and improvements will readily occur to those skilled in the art. Such alterations, modifications and improvements are intended to be within the scope and spirit of the disclosure. Accordingly, the foregoing description is by way of example only and is not intended as limiting.

What is claimed is:

1. A method of optimizing power loads in a power strip of the type having single or three phase power input, a plurality of circuit breakers, and a plurality of outlets, the arrangement being such that at least one circuit breaker is associated with at least one outlet, the method comprising:
    obtaining real-time current measurements for each phase of the single or three phase power input of the power strip;
    obtaining real-time current measurements for each circuit breaker of the plurality of circuit breakers of the power strip;
    logging the real-time current measurements for each phase of the single or three phase power input and for each circuit breaker of the plurality of circuit breakers; and
    analyzing the real-time current measurements of the single or three phase power input and the plurality of circuit breakers to determine a preferential order of outlets in which to apply a new load, wherein analyzing the real-time current measurements of the single or three phase power input and the plurality of circuit breakers comprises identifying a user preference between preventing an overload of one of the plurality of circuit breakers and balancing a phase load of the single or three phase power input when employing three phase power input.

2. The method of claim 1, further comprising displaying the preferential order of outlets on a display.

3. The method of claim 2, further comprising sending the preferential order of outlets over a communication network to the display.

4. The method of claim 1, further comprising identifying whether a particular outlet of the plurality of outlets is occupied.

5. The method of claim 1, wherein analyzing the real-time current measurements of the single or three phase power input and the plurality of circuit breakers comprises identifying the maximum allowable additional load.

6. The method of claim 5, wherein identifying the maximum allowable additional load includes determining the minimum of the following:
    a rating of a breaker bank of the rack power distribution unit minus data log maximum logged value for the breaker;
    a maximum allowable load on a first feed phase line to the breaker bank or outlet minus data log maximum logged value for that first phase line;
    a maximum allowable load on a second feed phase line to the breaker bank or outlet minus data log maximum logged value for that second feed phase line; and
    a maximum amps for the outlet.

7. A computer readable medium having stored thereon sequences of instruction including instructions that will cause a processor to:
    obtain real-time current measurements of each phase of a single or three phase power input of a power strip;
    obtain real-time current measurements of each circuit breaker of a plurality of circuit breakers of the power strip;
    log the real-time current measurements each phase of the single or three phase power input and each circuit breaker of the plurality of circuit breakers; and
    analyze the real-time current measurements of the single or three phase power input and the plurality of circuit breakers to determine a preferential order of outlets in which to apply a new load,
    wherein the processor is configured to, when analyzing the real-time current measurements of the single or three phase power input and the plurality of circuit breakers, identify a user preference between preventing an overload of one of the plurality of circuit breakers and balancing a phase load among the single or three phase power input when employing three phase power input.

8. The computer readable medium of claim 7, wherein the processor is further configured to send the preferential order of outlets to a display.

9. The computer readable medium of claim 8, wherein the processor is further configured to send the preferential order of outlets to the display over a communication network.

10. The computer readable medium of claim 7, wherein the processor is further configured to, when analyzing the real-time current measurements of the single or three phase power input and the plurality of circuit breakers, identify the maximum allowable additional load.

11. The computer readable medium of claim 7, wherein the processor is further configured to, when identifying the maximum allowable additional load, determine the minimum of the following:
    a rating of a breaker bank of the rack power distribution unit minus data log maximum logged value for the breaker;
    a maximum allowable load on a first feed phase line to the breaker bank or outlet minus data log maximum logged value for that first phase line;
    a maximum allowable load on a second feed phase line to the breaker bank or outlet minus data log maximum logged value for that second feed phase line; and
    a maximum amps for the outlet.

12. The computer readable medium of claim 7, wherein the processor is configured to identify whether a particular outlet of the plurality of outlets is occupied.

13. A power strip comprising:
    single or three phase power input;
    a plurality of circuit breakers in communication with the single or three phase power input;
    a plurality of outlets, the arrangement being such that at least one circuit breaker is associated with at least one outlet; and
    a controller configured to analyze the real-time current measurements of the single or three phase power input and the circuit breakers to determine a preferential order of outlets in which to apply a new load,
    wherein the processor, when analyzing the real-time current measurements of each phase of the single or three phase power input and the circuit breakers, identifies a user preference between preventing an overload of one of the plurality of circuit breakers and balancing phase load of the single or three phase power input when employing three phase power input.

14. The power strip of claim 13, further comprising a display to display the preferential order of outlets.

15. The power strip of claim 13, further comprising a communication network to send the preferential order of outlets over.

16. The power strip of claim 13, wherein the processor is further configured to obtain real-time current measurements of each phase of the single or three phase power input of the power strip, obtain real-time current measurements of each of the plurality of circuit breakers of the power strip, and log the real-time current measurements of each phase of the single or three phase power input and the circuit breakers.

17. The power strip of claim 13, further comprising a sensor to identify whether a particular outlet of the plurality of outlets is occupied.

\* \* \* \* \*